(12) United States Patent
Walters et al.

(10) Patent No.: US 7,997,590 B2
(45) Date of Patent: Aug. 16, 2011

(54) INFANT CAR SEAT CADDY

(76) Inventors: Charnelsa Walters, Sherwood, AR (US); James E. Randle, Sherwood, AR (US)

( * ) Notice: Subject to any disclaimer, the term of this patent is extended or adjusted under 35 U.S.C. 154(b) by 248 days.

(21) Appl. No.: 12/465,334

(22) Filed: May 13, 2009

(65) Prior Publication Data

US 2009/0218775 A1    Sep. 3, 2009

(51) Int. Cl.
*B62B 3/02* (2006.01)
*B62B 7/06* (2006.01)

(52) U.S. Cl. ....... 280/35; 248/423; 280/47.38; 280/647; 297/250.1

(58) Field of Classification Search .............. 248/129, 248/132, 150, 157, 161, 166, 423; 280/35, 280/47.38, 47.41, 79.2, 638, 639, 647, 649; 297/250.1, 256.11, 256.16
See application file for complete search history.

(56) References Cited

U.S. PATENT DOCUMENTS

| | | | |
|---|---|---|---|
| 3,435,570 A * | 4/1969 | Berry | 52/109 |
| 3,649,074 A * | 3/1972 | McDonald et al. | 297/153 |
| 4,239,259 A * | 12/1980 | Martinez | 280/649 |
| 5,090,724 A * | 2/1992 | Fiore | 280/643 |
| 5,248,181 A * | 9/1993 | Efthimiou | 297/130 |
| 5,527,096 A * | 6/1996 | Shimer | 297/327 |
| 5,564,778 A * | 10/1996 | Shimer et al. | 297/130 |
| 6,446,990 B1 * | 9/2002 | Nania et al. | 280/47.371 |
| 6,547,195 B1 * | 4/2003 | Kokuzian et al. | 248/129 |
| 7,624,954 B2 * | 12/2009 | Randle et al. | 248/129 |
| 7,703,726 B2 * | 4/2010 | Harrison et al. | 248/166 |
| 7,896,431 B2 * | 3/2011 | Cui et al. | 297/16.1 |

FOREIGN PATENT DOCUMENTS

GB          2433027 A   *   6/2007
* cited by examiner

*Primary Examiner* — Toan C To
*Assistant Examiner* — Laura Freedman
(74) *Attorney, Agent, or Firm* — Dale J. Ream

(57) ABSTRACT

A car seat caddy for use in supporting an infant seat of a type having an underside defining front and rear lateral grooves includes a pair of front and rear upstanding tubular members each being telescopically movable between retracted and extended configurations. A pair of upper support members extends between respective front and rear tubular members, each having a front and rear ends coupled to respective front and rear tubular member and having a curved configuration. A front seat support bar having opposed ends is pivotally coupled to the respective front tubular members and movable between selective position, the front seat support bar having a configuration complementary to a front groove defined by the underside of the infant seat. A similar rear seat support bar may also be included with respective rear tubular support members.

5 Claims, 9 Drawing Sheets

INFANT CAR SEAT CADDY

CROSS REFERENCE TO RELATED APPLICATIONS

This application claims priority to U.S. non-provisional patent application US 2008/0136233 filed Dec. 10, 2007 entitled INFANT CAR SEAT CADDY, which claims priority to U.S. provisional application Ser. No. 60/873,963 filed Dec. 11, 2006, the specification of which is incorporated herein by reference in its entirety.

BACKGROUND OF THE INVENTION

The present invention relates to car seats, e.g., infant car seats. More specifically, this invention is concerned with an infant car seat caddy that supports an infant car seat above a ground or support surface and permits the infant car seat situated thereon to be transported from a first location to a second location by pushing and steering the carrying handle of the infant car seat.

Infant car seats are used to carry and transport infants and small children to a vehicle and to secure said infants and small children to the interior of a vehicle, usually upon a vehicle seat, by means of seat belts and passenger harnesses. The infant car seats are used to secure infants and small children within the interior of a vehicle as the seats and associated seat belts and passenger harnesses of a vehicle do not accommodate the relatively smaller sizes of infants and small children. An infant or small child secured to a vehicle seat by a seat belt or passenger harness would not be adequately restrained by the seat belt or passenger harness, especially when the vehicle experiences sudden deceleration or is impacted by another vehicle.

A typical infant car seat is equipped with dedicated restraining straps to secure the infant or small child to the infant car seat and a series of slots, openings, or other straps to receive or connect to the seat belts or passenger harnesses of a vehicle seat. In this manner, the infant car seat can be securely attached to a vehicle seat, and an infant or small child can be securely attached to the infant car seat. Nevertheless, conventional infant car seats suffer from several disadvantages. They are typically constructed of a bulky seat portion or section that receives or holds the infant or small child therein and an attached carrying handle. The carrying handle projects at some distance above the seat portion and must of sufficient size and bulk to bear the weight of the infant car seat with an infant or small child situated therein. These features of an infant car seat make it difficult to carry either by the carrying handle or by the seat portion, especially when it is necessary to transport an infant car seat with an infant or small child situated therein over an appreciable distance.

What is needed then to overcome the aforementioned disadvantages of conventional infant car seats is the provision of an infant car seat caddy that can receive and support an infant car seat with an infant or small child situated therein and permit the infant car seat with infant or small child to be transported from a first location to a second location. The subject of the instant invention introduces an infant car seat caddy that can be extended to full height during use and retracted during non-use for storage. During extension of the infant car seat caddy, an infant car seat is situated, located, or positioned on the top of the infant car seat caddy and wheeled over the distance to be traveled by pushing the infant car seat or carrying handle thereof and steering or maneuvering the infant car seat as needed to direct the infant car seat and infant car seat caddy from a first location to a second location.

Numerous designs for infant car seats and infant car seat strollers have been provided in the prior art. Even though these designs may be suitable for the specific individual purposes to which they address, they would not be suitable for the purposes of the present invention as such designs are intended to function as infant car seats and conventional infant and small child transport devices, such as strollers. The infant car seat strollers available in the prior art are generally elaborate in design and cumbersome to use. These designs are exemplified by the following patents:

U.S. Pat. No. 2,720,911, Convertible Baby Stroller and Child's Seat For Automobiles, issued to Lantz on 18 Oct. 1955;

U.S. Pat. No. 3,984,115, Convertible Baby Carrier, issued to Miller on 5 Oct. 1976;

U.S. Pat. No. 4,586,721, Convertible Stroller, issued to Harada et al. on 6 May 1986;

U.S. Pat. No. 4,762,331, Combination Automobile Seat And Stroller, issued to Tucker et al. on 9 Aug. 1988;

U.S. Pat. No. 4,915,401, Child Carrier Usable As Backpack, Stroller And Recliner, issued to Severson et al. on 10 Apr. 1990;

U.S. Pat. No. 6,986,518, Combined Baby Car Seat And Stroller, issued to Besaw 17 Jan. 2006; and U.S. Pat. No. 7,011,316, Infant Car Seat Stroller, issued to Peridon on 14 Mar. 2006.

As illustrated by the background art, efforts are continuously being made in an attempt to develop devices for transporting small children outside of a vehicle. No prior effort, however, provides the benefits attendant with the present invention.

As such, it may be appreciated that there is a continuing need for a new and improved infant car seat caddy, said infant car seat caddy able to be extended to full height during use and retracted to a compact configuration during non-use. During use, the infant car seat caddy receives on the top end thereof an infant car seat with an infant or small child situated therein. The infant car seat is wheeled over the distance to be traveled by pushing the infant car seat or carrying handle thereof and steering or maneuvering the infant car seat as needed to direct the infant car seat and infant car seat caddy from a first location to a second location. In these respects, the present invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful, and unobvious combination of method steps and component elements, with the use of a minimum number of functioning parts, at a reasonable cost to manufacture, and by employing only readily available materials.

SUMMARY OF THE INVENTION

A car seat caddy for use in supporting an infant seat of a type having an underside defining front and rear lateral grooves includes a pair of front and rear upstanding tubular members each being telescopically movable between retracted and extended configurations. A pair of upper support members extends between respective front and rear tubular members, each having a front and rear ends coupled to respective front and rear tubular member and having a curved configuration. A front seat support bar having opposed ends is pivotally coupled to the respective front tubular members and movable between selective position, the front seat support bar having a configuration complementary to a front groove defined by the underside of the infant seat. A similar rear seat support bar may also be included with respective rear tubular support members.

Therefore, a general object of this invention is to provide a device for supporting and efficiently transporting an infant car seat between two locations.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

The foregoing and other objects, features, and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

FIG. 7a is another side view of the car seat caddy as in FIG. 6a;

FIG. 9b is an isolated view on an enlarged scale taken from FIG. 9a.

DESCRIPTION OF PREFERRED EMBODIMENTS

Figure 1:
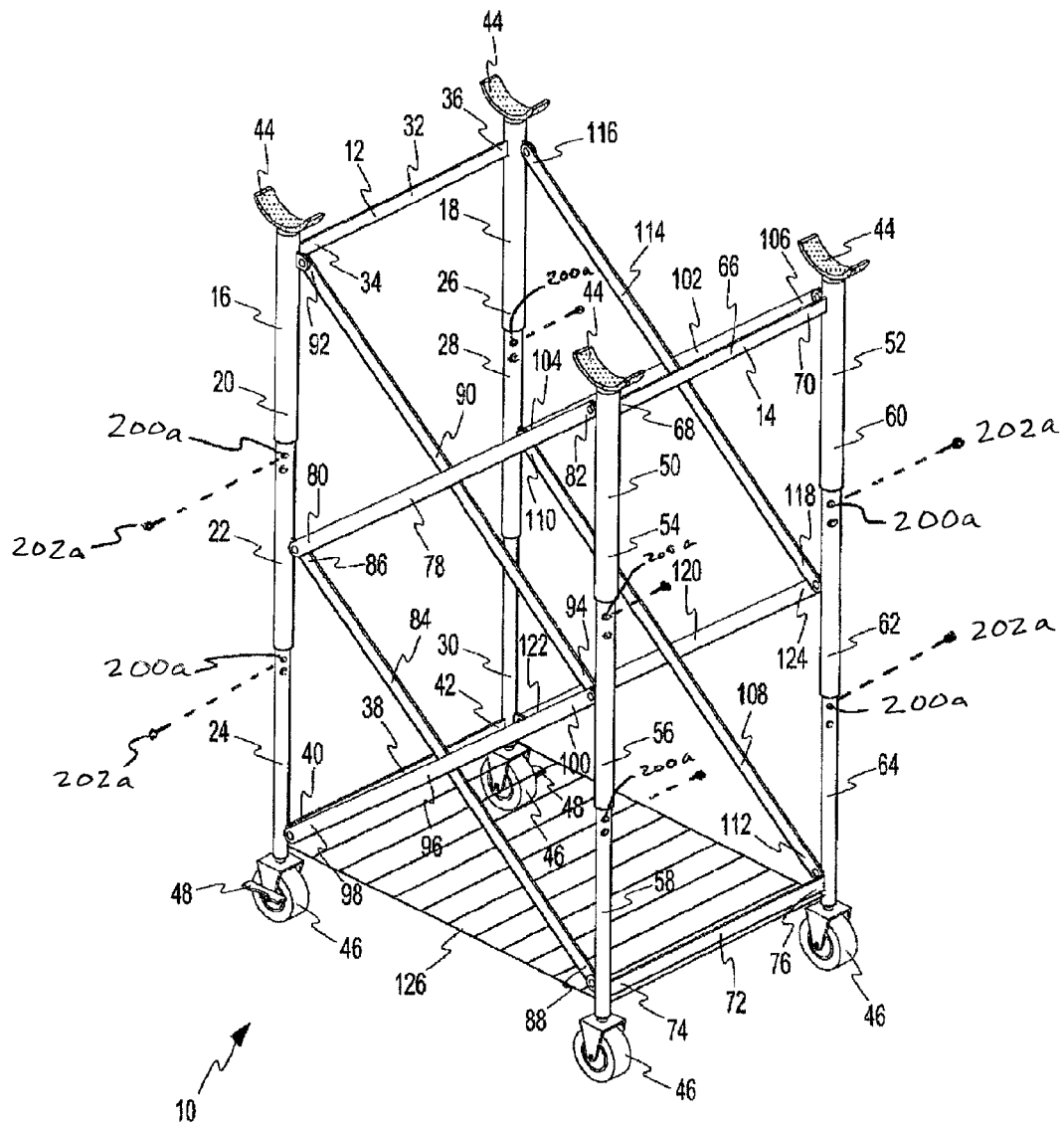
FIG. 1 is a perspective view of an infant car seat caddy in an extended configuration in accordance with one embodiment of the present invention.

Referring now to the drawings and, in particular, to FIG. 1 wherein there is illustrated an embodiment of the infant car seat caddy 10, which is configured in the fully extended or raised position. The present invention 10 comprises a first support assembly 12 and a second support assembly 14, which are joined by a series of braces pivotally attached (see FIG. 4) thereto. The first 12 and second 14 support assemblies which are attached together by the braces can be raised into an extended position and lowered into a retracted position.

The first support assembly 12 comprises a first tubular member 16 and a second tubular member 18. The first tubular member 16 comprises an upper section 20, a middle section 22, and a lower section 24. The middle section 22 is telescopically engaged within the upper section 20, and the lower section 24 is telescopically engaged within the middle section 22. The second tubular member 18 comprises an upper section 26, a middle section 28, and a lower section 30. The middle section 28 is telescopically engaged within the upper section 26, and the lower section 30 is telescopically engaged within the middle section 28.

A first brace 32 is attached at a first end 34 thereof to the upper section 20 of the first tubular member 16 and at a second end 36 thereof to the upper section 26 of the second tubular member 18. A second brace 38 is connected at a first end 40 thereof to the lower section 24 of the first tubular member 16 and at a second end 42 thereof to the lower section 30 of the second tubular member 8. A non-skid pad 44 is attached to the top end of the upper section 20 of the first tubular member 16, and a swivel wheel 46 with hand brake 48 is pivotally attached to the bottom end of the lower section 24 of the first tubular member 16. Similarly, a non-skid pad 44 is attached to the top end of the upper section 26 of the second tubular member 18, and a swivel wheel 46 with hand brake 48 is pivotally attached to the bottom end of the lower section 30 of the second tubular member 18.

The second support assembly 14 comprises a third tubular member 50 and a fourth tubular member 52. The third tubular member 50 comprises an upper section 54, a middle section 56, and a lower section 58. The middle section 56 is telescopically engaged within the upper section 54, and the lower section 58 is telescopically engaged within the middle section 56. The fourth tubular member 52 comprises an upper section 60, a middle section 62, and a lower section 64. The middle section 62 is telescopically engaged within the upper section 60, and the lower section 64 is telescopically engaged within the middle section 62. A third brace 66 is attached at a first end 68 thereof to the upper section 54 of the third tubular member 50 and at a second end 70 thereof to the upper section 60 of the fourth tubular member 52. A fourth brace 72 is connected at a first end 74 thereof to the lower section 58 of the third tubular member 50 and at a second end 76 thereof to the lower section 64 of the fourth tubular member 52.

A non-skid pad 44 is attached to the top end of the upper section 54 of the third tubular member 50, and a swivel wheel 46 is pivotally attached to the bottom end of the lower section 58 of the third tubular member 50. A non-skid pad 44 is also affixed to the top end of the upper section 60 of the fourth tubular member 52, and a swivel wheel 46 is pivotally attached to the bottom end of the lower section 64 of the fourth tubular member 52.

Referring again to FIG. 1, a fifth brace 78 is pivotally attached at a first end 80 thereof to the middle section 22 of the first tubular member 16 of the first support assembly 12 and at a second end 82 thereof to the upper section 54 of the third tubular member 50 of the second support assembly 14. A sixth brace 84 is pivotally attached at a first end 86 thereof to the middle section 22 of the first tubular member 16 of the first support assembly 12 and at a second end 88 thereof to the lower section 58 of the third tubular member 50 of the second support assembly 14. A seventh brace 90 is pivotally attached at a first end 92 thereof to the upper section 20 of the first tubular member 16 of the first support assembly 12 and at a second end 94 thereof to the middle section 56 of the third tubular member 50 of the second support assembly 14. An eighth brace 96 is pivotally attached at a first end 98 thereof to the lower section 24 of the first tubular member 16 of the first support assembly 12 and at a second end 100 thereof to the middle section 56 of the third tubular member 50 of the second support assembly 14.

A ninth brace 102 is pivotally attached at a first end 104 thereof to the middle section 28 of the second tubular member 18 of the first support assembly 12 and at a second end 106 thereof to the upper section 60 of the fourth tubular member 52 of the second support assembly 14. A tenth brace 108 is pivotally attached at a first end 110 thereof to the middle section 28 of the second tubular member 18 of the first support assembly 12 and at a second end 112 thereof to the lower section 64 of the fourth tubular member 52 of the second support assembly 14. A eleventh brace 114 is pivotally attached at a first end 116 thereof to the upper section 26 of the second tubular member 18 of the first support assembly 12 and at a second end 118 thereof to the middle section 62 of the fourth tubular member 52 of the second support assembly 14. A twelfth brace 120 is pivotally attached at a first end 122 thereof to the lower section 30 of the second tubular member 18 of the first support assembly 12 and at a second end 124 thereof to the middle section 62 of the fourth tubular member 52 of the second support assembly 14. The braces 78, 84, 90, 96, 102, 108, 114, 120 stabilize the infant car seat caddy 10 when it is in a raised or extended configuration, a lowered or compact configuration, and during transport of an infant car seat upon the infant car seat caddy 10.

In some embodiments, a shelf 126 is attached at the lower portion of the infant car seat caddy 10. More specifically, the shelf 126 is attached at corners thereof to the lower sections 24, 30, 58, 64 of respective tubular members 16, 18, 50, 52. In some embodiments, the shelf is constructed from an elastic material, such that when the caddy is collapsed to its contracted position, the shelf can stretch to accommodate for the braces being more horizontal with respect to the tubular members.

The infant car seat caddy 10 and the components thereof (tubular members and braces) are manufactured of material that is lightweight, rigid, durable, and resistant to oxidation, corrosion, and the like, such as non-ferrous metals, stainless steel, aluminum, plastic, fiberglass, and various composite materials.

In some embodiments, the middle and lower sections of the tubular members comprise at least one hole 200a wherein a pin 202a may be inserted to lock the tubular members in an extended telescoping configuration (see FIG. 1).

Figure 2:
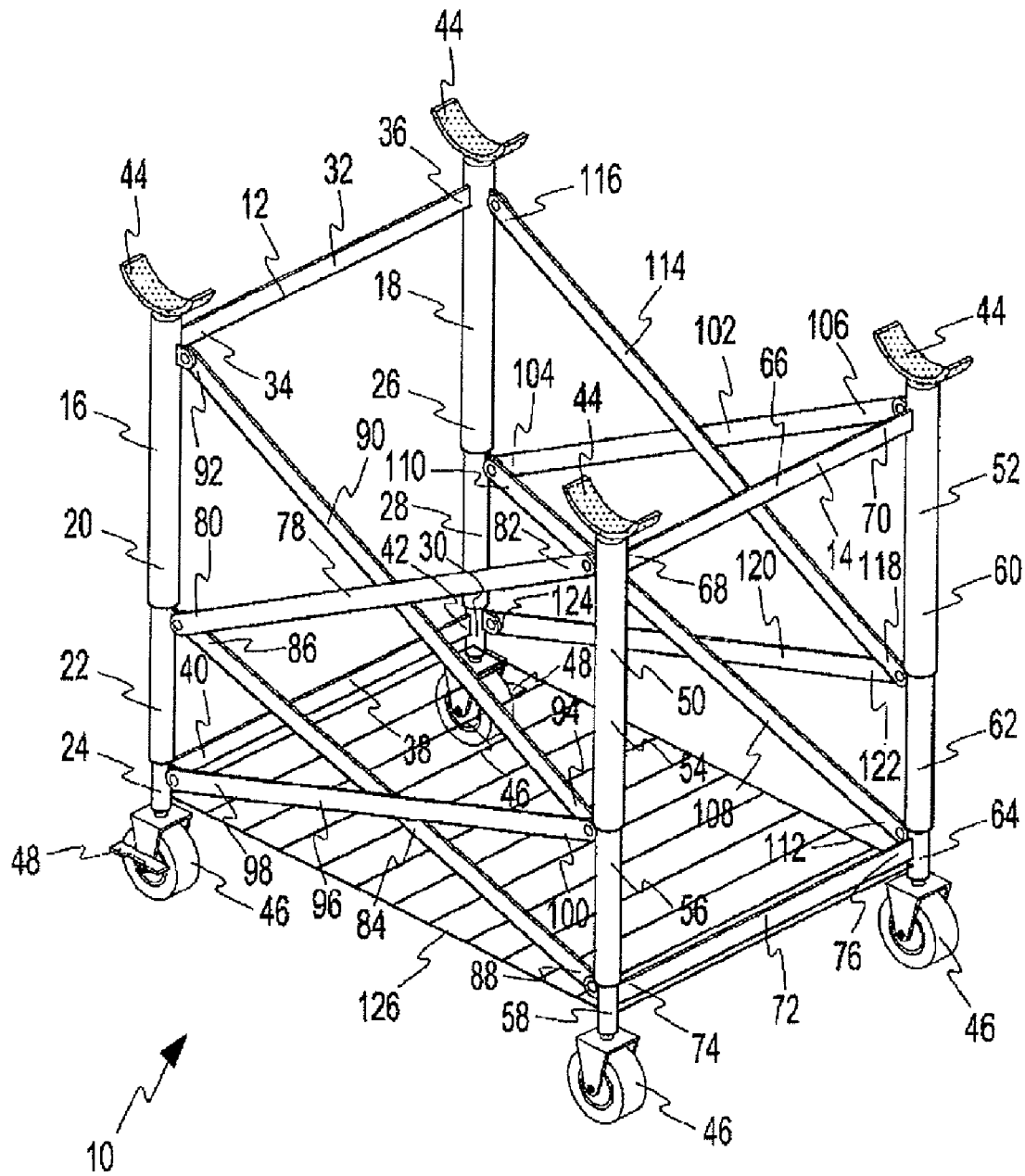
FIG. 2 is a perspective view of an infant car seat caddy in a compacted configuration in accordance with the embodiment of FIG. 1.

Referring to FIG. 2, therein illustrated is the infant car seat caddy 10 in the retracted or lowered position. The lower section 24 of the first tubular member 16 of the first support assembly 12 retracts within the middle section 22 thereof and the middle section 22 thereof retracts within the upper section 20 of the first tubular member 16. The lower section 30 of the second tubular member 18 of the first support assembly 12 retracts within the middle section 28 thereof, and the middle section 28 thereof retracts within the upper section 26 of the second tubular member 18. The lower section 58 of the third tubular member 50 of the second support assembly 14 retracts within the middle section 56 thereof, and the middle section 56 thereof retracts within the upper section 54 of the third tubular member 50. The lower section 64 of the fourth tubular member 52 of the second support assembly 14 retracts within the middle section 62 thereof, and the middle section 62 thereof retracts within the upper section 60 of the fourth tubular member 52. The braces 78, 84, 90, 96, 102, 108, 114, 120 pivot at respective attachments to the tubular members 16, 18, 50, 52 as the support assemblies 14, 16 of the caddy 10 are lowered upon respective upper sections 20, 26, 54, 60, middle sections 22, 28, 56, 62, and lower sections 24, 30, 58, 64 thereof. Conversely, the braces 78, 84, 90, 96, 102, 108, 114, 120 pivot at respective attachments to the tubular members 16, 18, 50, 52 as the support assemblies 14, 16 of the caddy 10 are raised from respective upper sections 20, 26, 54, 60, middle sections 22, 28, 56, 62, and lower sections 24, 30, 58, 64 thereof. The infant car seat caddy 10 contains internal locking mechanisms of the type well known in prior art and design that are located within the upper sections 20, 26, 54, 60, middle sections 22, 28, 56, 62, and lower sections 24, 30, 58, 64 of respective tubular members 16, 18, 50, 52 to maintain the infant car seat caddy 10 in position when it is raised and lowered.

Figure 3:
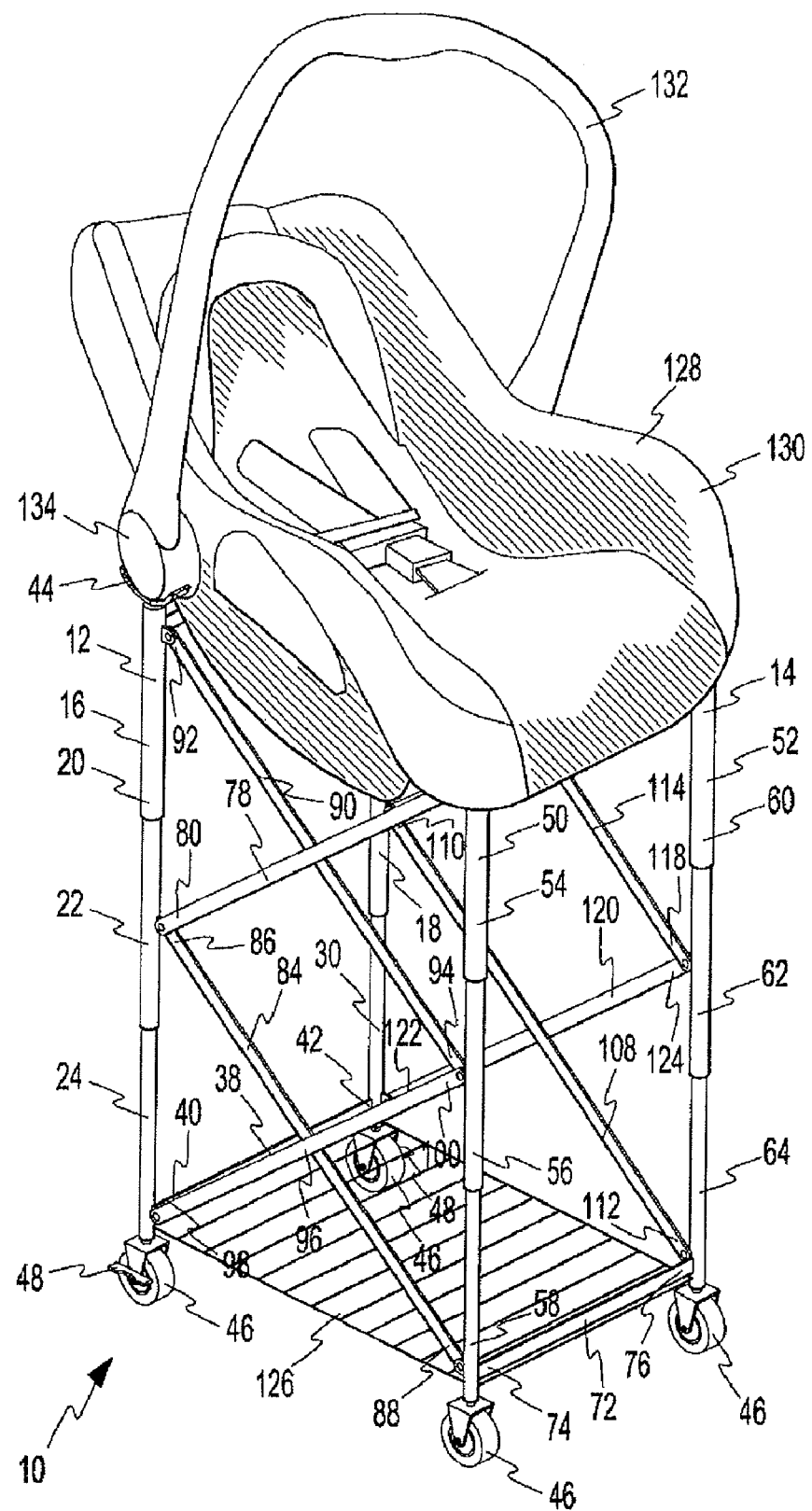
FIG. 3 is a perspective view of an infant car seat caddy in an extended configuration in use with an infant car seat for transport in accordance with the embodiment of FIG. 1.

As illustrated in FIG. 3, an infant car seat 128 is located upon the infant car seat caddy 10. The infant car seat 128 comprises a seat 130, a pivoting carrying handle 132, and two knobs 134 located at opposite ends of the carrying handle 132. The knobs 134 connect the carrying handle 132 to the seat 130 and allow the carrying handle 132 to pivot as needed with respect to the seat 130. The knobs 134 are supported by the pads 44 attached to the top ends of the tubular members 16, 18 of the first support assembly 12, and the front end of the seat 130 is situated on and over the pads 44 attached to the top ends of the tubular members 50, 52 of the second support assembly 14. In this manner, the infant car seat 128 and infant car seat caddy 10 can be directed over the surface to travel by steering, pushing, or otherwise maneuvering the carrying handle 132 and seat 130 from a first location to a second location. The infant car seat caddy 10 travels upon a ground surface or support by the swivel wheels 46. When it is necessary to pause, the hand brakes 48 can be activated on two cooperating swivel wheels 46 to prevent the infant car seat caddy 10 and infant car seat 128 from drifting or otherwise moving from its temporary location.

Figure 4:
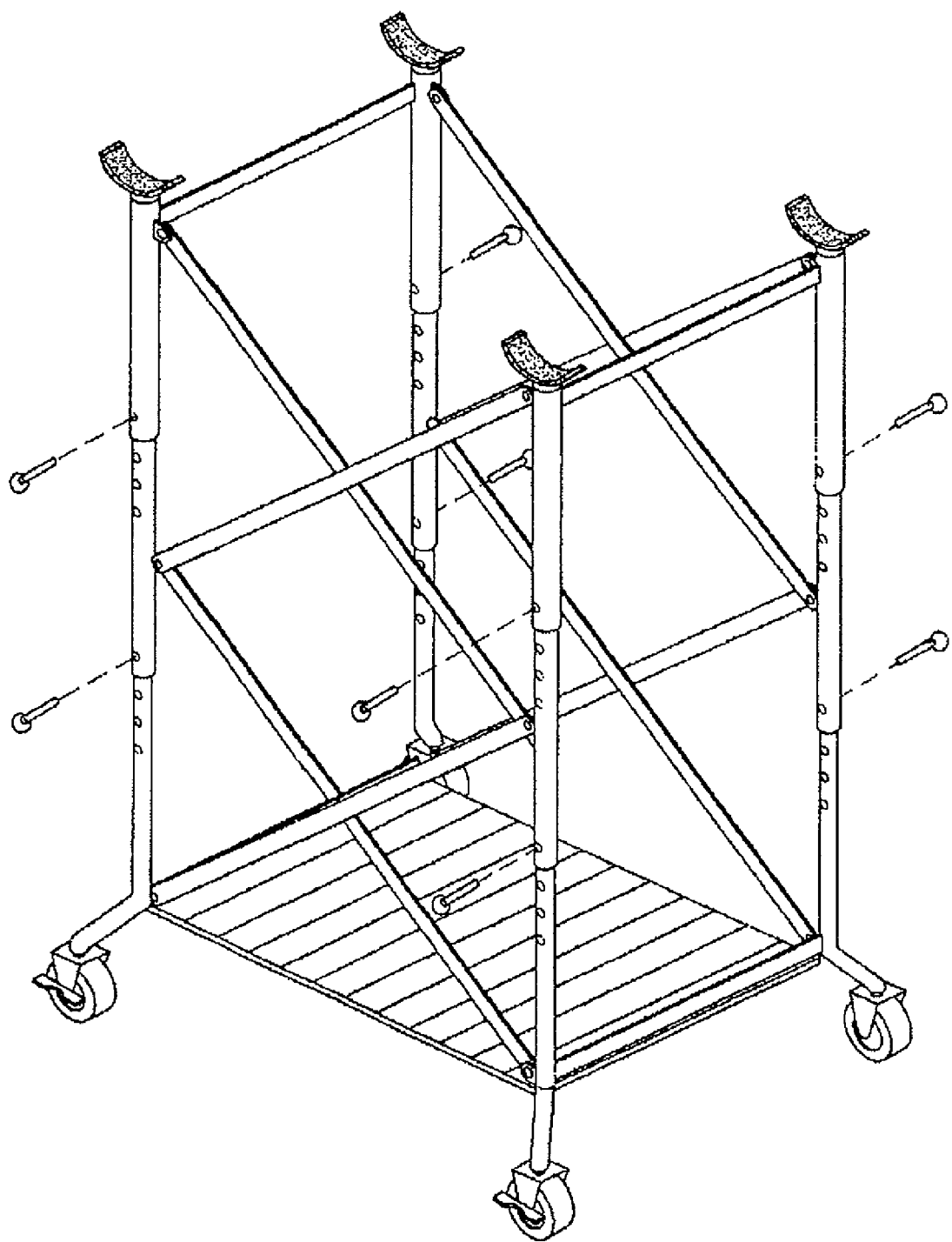
FIG. 4 shows a perspective view of an infant car seat caddy having the wheels being extended outward for added stability.

In some embodiments, the tubular members of the infant car seat caddy 10 comprises one or more holes 200a for insertion of a peg 202a, wherein the peg 202 is effective to maintain the infant car seat caddy 10 in an expanded position by preventing the larger tubular member from collapsing onto the smaller tubular member (see FIG. 1 and FIG. 4).

In some embodiments, the braces are pivotally attached to the tubular members as shown in the enlargements in FIG. 4.

The infant car seat caddy 10 can be used with a wide variety of infant car seats so that the infant car seats can be supported thereon with said infant car seats able to be steered or maneuvered by respective carrying handles or other component thereof.

A car seat caddy 200 according to another embodiment of the invention is shown in FIGS. 5 to 9b and is similar to the embodiment described above except as specifically described below. The car seat caddy 200 is particularly designed for use with a car seat 202 of a type having an underside 204 that defines a front horizontal groove 206 and a rear horizontal groove 208, each groove extending laterally between sides of the car seat 202. More particularly, the car seat caddy 200 according to this embodiment includes a framework having a pair of front upstanding tubular members 210 and a pair of rear upstanding tubular members 220. Each front and rear tubular member includes lower 212, 222 and upper 214, 224 ends, respectively, and a respective upper section telescopically movable in a respective lower section between retracted and extended configurations. As shown in FIGS. 6a to 6c, each tubular member may also include one or more intermediate sections for use in telescopic movement.

Figure 8A:
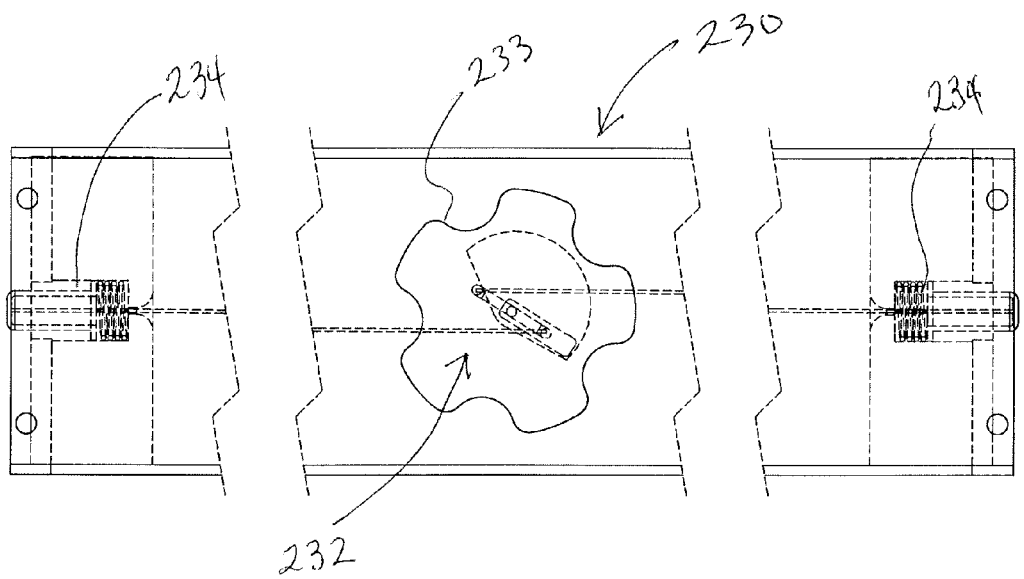
FIG. 8a is a fragmentary view of a height selection brace illustrating an internal linkage in a retracted configuration.
Figure 8B:
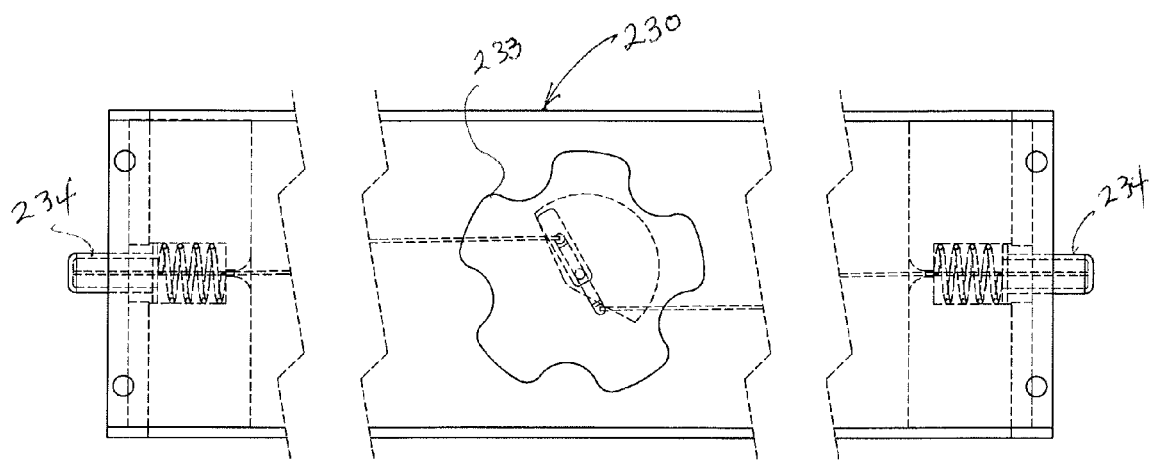
FIG. 8b is another view as in FIG. 8b illustrating the linkage in an extended configuration.

At least one height selection brace 230 extends horizontally between respective front 210 and rear 220 tubular members, each height selection brace including a linkage 232 having opposed pins 234 that are movable between extended and retracted configurations (FIG. 8a). Preferably, the linkage is actuated with a knob 233. Further, each front 210 and rear 220 tubular member defines a plurality of spaced apart apertures 236, each aperture being configured to selectively receive a respective pin when the respective pin is at a pin extended configuration. In other words, a cooperation between a respective pin 234 and aperture 236 enables a respective tubular member to maintain a selected height (FIGS. 8a, 8b).

Figure 5:
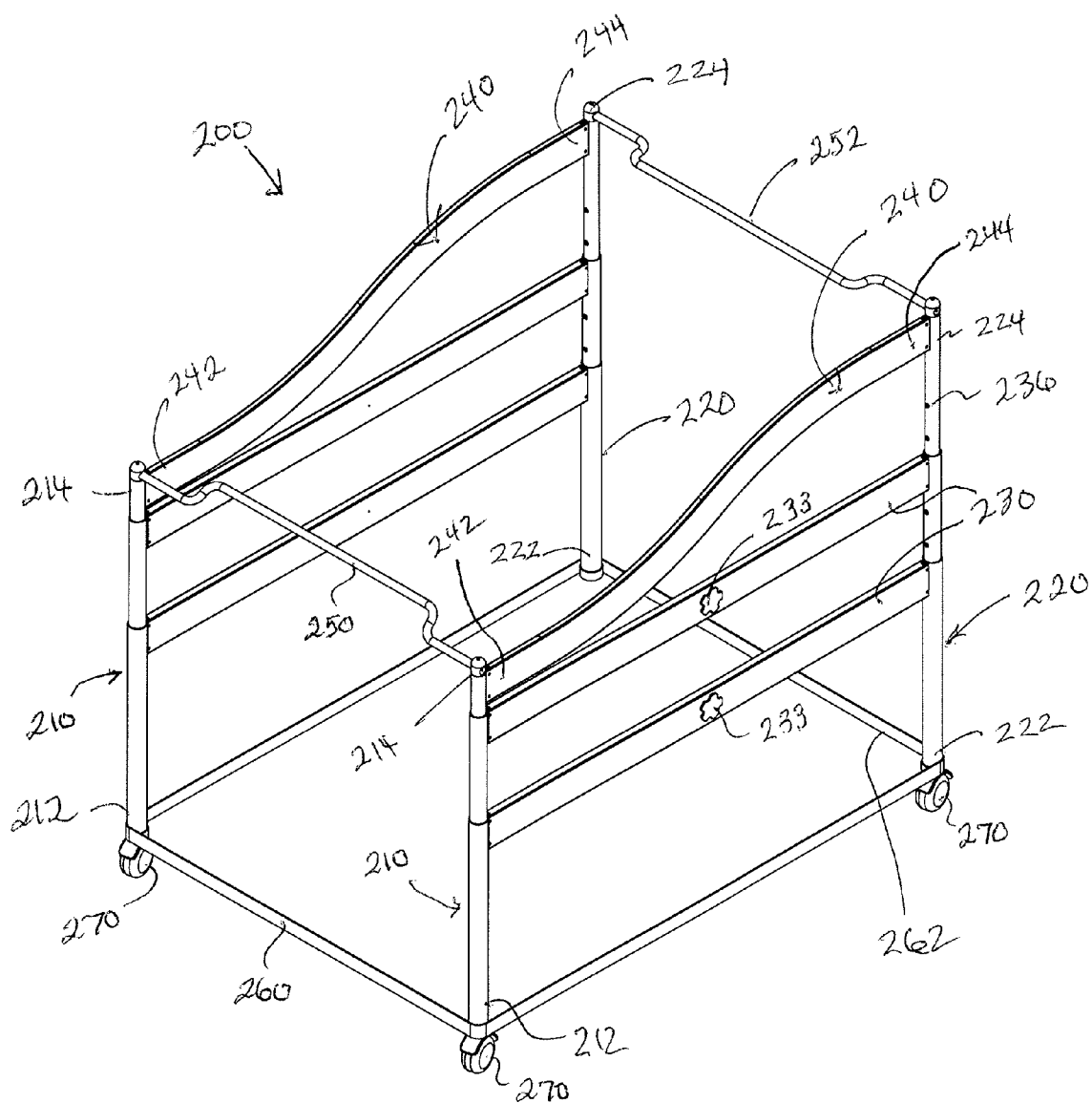
FIG. 5 is a perspective view of an infant car seat caddy according to another embodiment of the present invention.
Figure 6A:
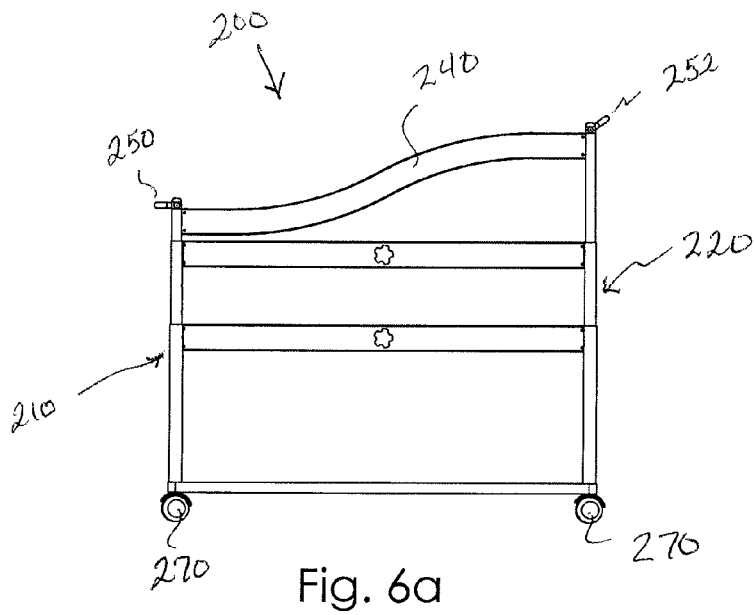
FIGS. 6a to 6c are side views of the car seat caddy as in FIG. 5 showing different telescopic positions of the front and rear tubular members.
Figure 6B:
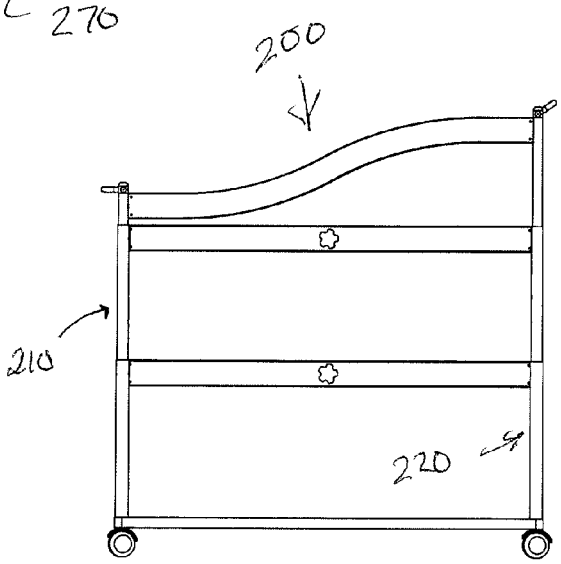
Figure 6C:
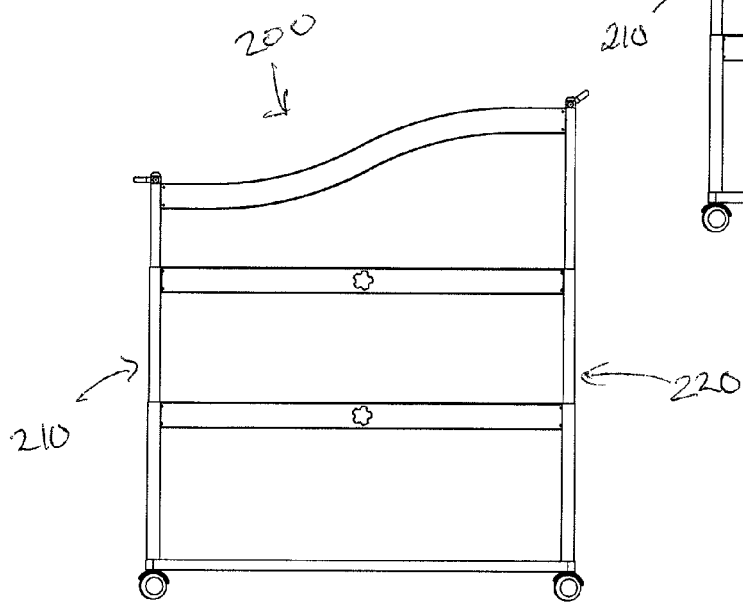
Figure 7A:
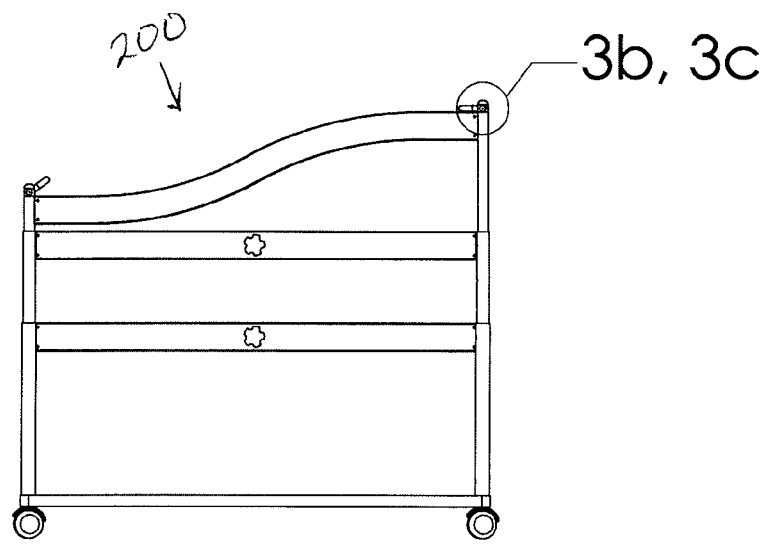
Figures 7B, 7C:
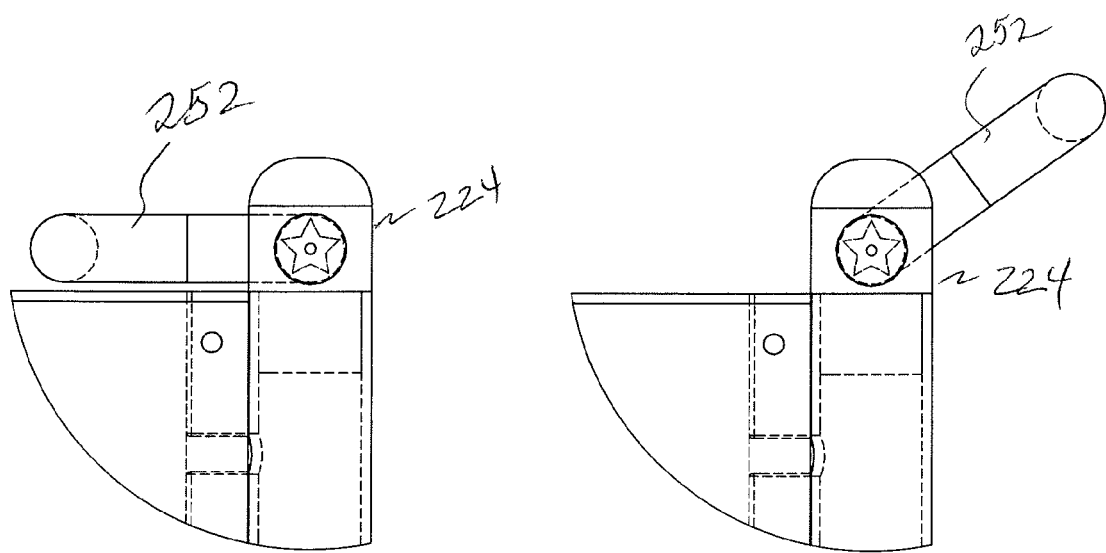
FIG. 7b is an isolated view on an enlarged scale taken from FIG. 7a showing a rear support bar in one configuration.
FIG. 7c is another view of the isolated portion as in FIG. 7c shown in another configuration.

A pair of upper support members 240 extends between respective front and rear tubular members, each upper support member 240 having a front end 242 coupled to a respective front tubular member 210 and a rear end 244 coupled to a respective rear tubular member 220 and having a curved configuration (FIG. 5). It is understood that for the upper support members 240 to be generally level, the rear tubular members 220 must be telescopically extended higher than the front tubular members 210 (FIG. 5).

Figure 9A:
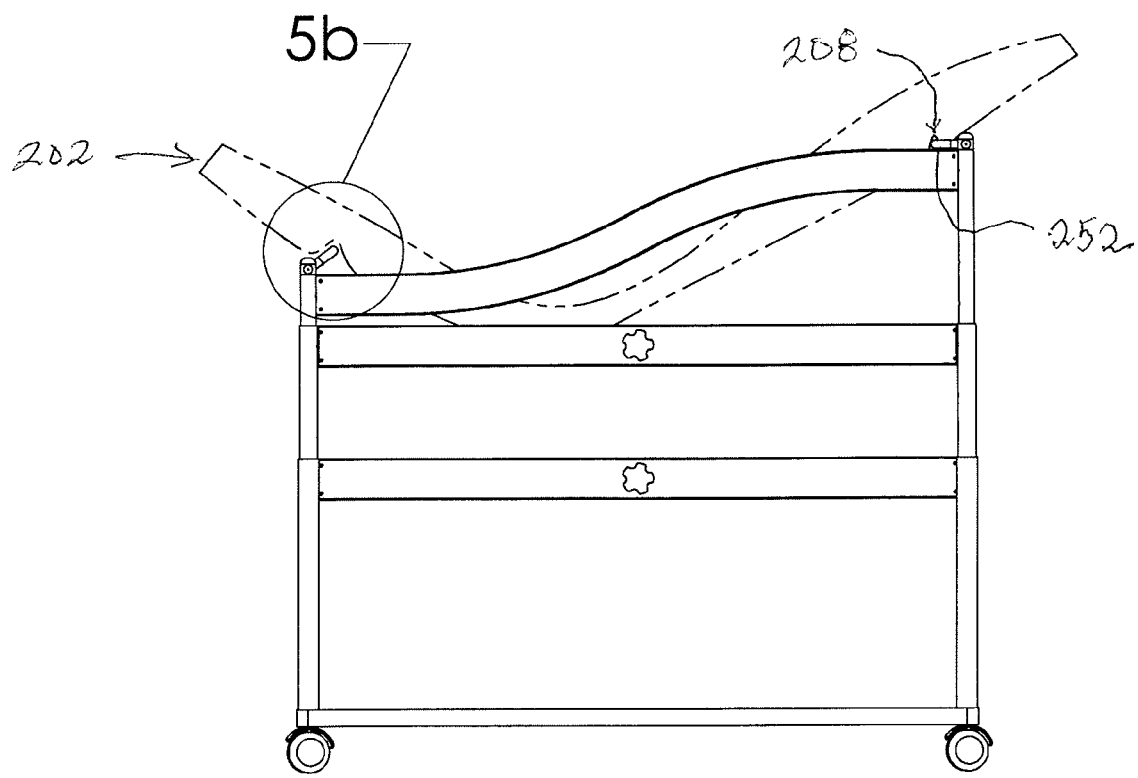
FIG. 9a is a side view of a car seat caddy shown in use supporting an infant car seat.
Figure 9B:
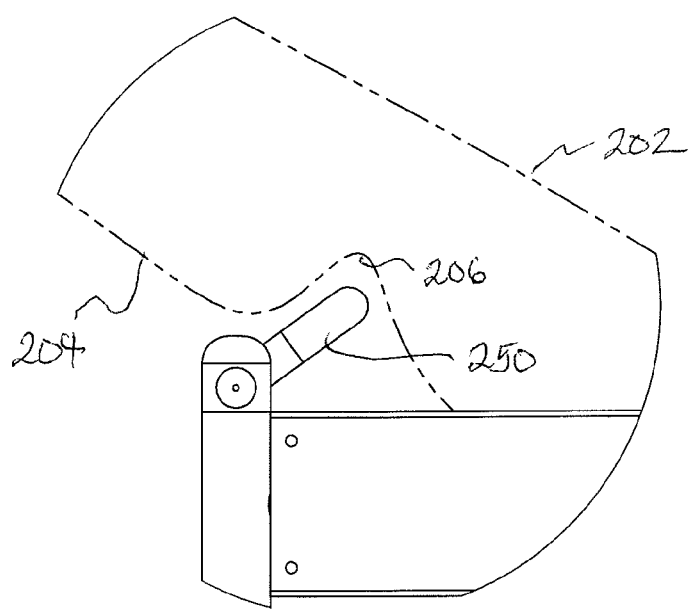

The car seat caddy 200 includes a front seat support bar 250 having opposed ends pivotally coupled to the respective front tubular members 210 and is movable between selective positions. The front seat support bar 250 includes a configuration that is complementary to the front groove 206 defined by the underside of the infant car seat 202 (FIG. 9b).

The car seat caddy 200 includes a rear seat support bar 252 having opposed ends pivotally coupled to the respective rear tubular member 220 and movable between selective positions (FIGS. 7b, 7c), the rear seat support bar 252 having a configuration complementary to the rear groove 208 defined by the underside of the infant seat. It is understood that the infant seat 202 is held in a stable position atop the framework when the front and rear support bars are nested in the front 206 and rear 208 grooves in the underside 204 of the infant seat 202 (FIGS. 9a, 9b). It is understood that some embodiments of this invention may only include one of the front or rear support bars.

The car seat caddy 200 further includes a front strut 260 that extends laterally between lower ends of respective front tubular members. A rear strut 262 extends between lower ends of respective rear tubular members 220. It is understood that a platform may extend between front 260 and rear 262 struts for holding articles such as a diaper bag or the like. A wheel 270 is coupled to respective lower ends of each front 210 and rear 220 tubular members.

While this invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

We claim:

1. A car seat caddy for use in supporting an infant seat of a type having an underside defining front and rear lateral grooves, said car seat caddy comprising:
   a pair of front upstanding tubular members and a pair of rear upstanding tubular members, each front and rear tubular member having lower and upper ends, respectively, and being telescopically movable between retracted and extended configurations;
   at least one height selection brace extending horizontally between respective front and rear tubular members, each height selection brace including a linkage having opposed pins movable between extended and retracted configurations;
   wherein each front and rear tubular member defines a plurality of spaced apart apertures, each aperture being configured to selectively receive a respective pin when said respective pin is at said pin extended configuration;
   a pair of upper support members extending between respective front and rear tubular members, each upper support member having a front end coupled to a respective front tubular member and a rear end coupled to a respective rear tubular member and having a curved configuration;
   a front seat support bar having opposed ends pivotally coupled to said respective front tubular members and movable between selective position, said front seat support bar having a configuration complementary to a front groove defined by the underside of the infant seat; and
   a rear seat support bar having opposed ends pivotally coupled to said respective front tubular members and movable between selective positions, said rear seat support bar having a configuration complementary to a rear groove defined by the underside of the infant seat.

2. The car seat caddy as in claim 1, further comprising:
   a front strut extending laterally between lower ends of respective front tubular members; and
   a rear strut extending laterally between lower ends of respective rear tubular members; and
   a pair of side struts extending between lower ends of respective front tubular members and respective rear tubular members.

3. The car seat caddy as in claim 1, wherein said curved member is at a level configuration when said rear tubular members are upwardly extended further than said front tubular members.

4. The car seat caddy as in claim 1, further comprising a wheel coupled to a lower end of each respective front and rear tubular member.

5. The car seat caddy as in claim 1, further comprising:
   a front strut extending laterally between lower ends of respective front tubular members; and
   a rear strut extending laterally between lower ends of respective rear tubular members;
   a pair of side struts extending between lower ends of respective front tubular members and respective rear tubular members;
   a wheel coupled to a lower end of each respective front and rear tubular member; and
   wherein said curved member is at a level configuration when said rear tubular members are upwardly extended further than said front tubular members.

* * * * *